United States Patent [19]
Millar et al.

[11] Patent Number: 5,457,781
[45] Date of Patent: Oct. 10, 1995

[54] SYSTEM HAVING MAIN UNIT FOR SHUTTING OFF CLOCKS TO MEMORY UPON COMPLETION OF WRITING DATA INTO MEMORY AND INFORMATION SUPERVISING UNIT TO READ THE DATA

[75] Inventors: James P. Millar; Eddie B. Collins, both of San Jose, Calif.

[73] Assignee: Amdahl Corporation, Sunnyvale, Calif.

[21] Appl. No.: 997,713

[22] Filed: Jan. 4, 1993

[51] Int. Cl.$^6$ .................................................. G06F 13/00
[52] U.S. Cl. .................... 395/200.19; 395/550; 395/750; 364/230.4; 364/240.9; 364/246.6; 364/DIG. 1
[58] Field of Search ................................ 395/200, 550, 395/425, 575, 725, 750, 800; 371/16.5, 22.1, 22.3

[56] References Cited

U.S. PATENT DOCUMENTS

| | | | |
|---|---|---|---|
| 4,545,030 | 10/1985 | Kitchin | 364/900 |
| 4,615,005 | 9/1986 | Maejima et al. | 364/200 |
| 4,851,987 | 7/1989 | Day | 364/200 |
| 4,985,894 | 1/1991 | Suga | 371/16.5 |
| 5,005,172 | 4/1991 | Kawamoto | 371/16.1 |
| 5,267,247 | 11/1993 | Uehara | 371/22.3 |
| 5,276,889 | 1/1994 | Shiraishi et al. | 395/750 |
| 5,293,572 | 3/1994 | Hasegawa et al. | 395/575 |
| 5,297,276 | 3/1994 | Millar et al. | 395/550 |
| 5,301,156 | 4/1994 | Talley | 371/22.3 |
| 5,321,698 | 11/1994 | Nguyen et al. | 371/12 |
| 5,365,047 | 11/1994 | Yamaguchi | 235/380 |

*Primary Examiner*—Thomas C. Lee
*Assistant Examiner*—Moustafa M. Meky
*Attorney, Agent, or Firm*—Fliesler, Dubb, Meyer & Lovejoy

[57] ABSTRACT

The invention provides a method and apparatus for immediate control communications between supervising and main processor units. A method in accordance with the invention comprises the steps of: providing a communications memory means within a first clocked system (main system); providing a protocol means within the first clocked system (main system) for indicating various communications states; providing a scan interface, operatively coupled to the communications memory means and the protocol means, for interrogating the state of the protocol means and for scanning data into or out of the communications memory means within a first clocked system (main system); coupling an external second system (SVP) by way of the scan interface to the protocol means and the communications memory means; operating the protocol means so as to indicate to the external second system (SVP) when it is permissible for the second system (SVP) to scan data into or out of the communications memory means; and further operating the protocol means so as to indicate to the first clocked system (main system) whether and/or when the external second system (SVP) has scanned data into or out of the communications memory means.

5 Claims, 7 Drawing Sheets

SYSTEM HAVING MAIN UNIT FOR SHUTTING OFF CLOCKS TO MEMORY UPON COMPLETION OF WRITING DATA INTO MEMORY AND INFORMATION SUPERVISING UNIT TO READ THE DATA

BACKGROUND

1. Field of the Invention

The invention relates generally to the field of digital communications. The invention relates more specifically to intercommunication between asynchronous systems.

2. Cross Reference to Related Copending Applications

The present application is related to the following copending U.S. patent applications:

(a) Ser. No. 07/670,289 entitled "SCANNABLE SYSTEM WITH ADDRESSABLE SCAN RESET GROUPS", by Robert Edwards et al, which was filed Mar. 15, 1991 and which issued Dec. 14, 1993 as U.S. Pat. No. 5,271,019; said application being assigned to the assignee of the present application; and (b) Ser. No. 07/814,389 entitled "METHOD AND APPARATUS FOR MAINTAINING DETERMINISTIC BEHAVIOR IN A FIRST SYNCHRONOUS SYSTEM WHICH RESPONDS TO INPUTS FROM NONSYNCHRONOUS SECOND SYSTEM", by James P Millar et al, which was filed Dec. 26, 1991 and which issued Mar. 22, 1994 as U.S. Pat. No. 5,297,276; said application being assigned to the assignee of the present application.

The disclosures of said copending applications are incorporated herein by reference.

3. Cross Reference to Related Patents

The following U.S. Patents are assigned to the assignee of the present application and are further incorporated herein by reference: (A) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981; (B) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988; (C) U.S. Pat. No. 4,819,166, MULTI-MODE SCAN APPARATUS, issued to Si et al Apr. 4, 1989; (D) U.S. Pat. No. 4,661,953, ERROR TRACKING APPARATUS IN A DATA PROCESSING SYSTEM, issued to Venkatesh et al, Apr. 28, 1987; (E) U.S. Pat. No. 4,835,728 DETERMINISTIC CLOCK CONTROL APPARATUS FOR A DATA PROCESSING SYSTEM, issued to Si, et al., May 30, 1989; and (F) U.S. Pat. No. 4,855,616, APPARATUS FOR SYNCHRONOUSLY SWITCHING FREQUENCY SOURCE, issued to Wang et al., Aug. 8, 1989.

4. Description of the Related Art

Special circuits and dedicated communications are conventionally used to process requests and responses between independently clocked systems. An example of this is seen in the so-called "console immediate control" signals that are exchanged between a mainframe computer and a system-supervising unit. Supervisory communications need to be exchanged at relatively rapid rates and supervisory commands often need to be executed as soon as possible.

A problem develops, however, when each of the mainframe computer and a system-supervising unit is synchronized to its own independent clock. The responses from the request/command receiving machine tend to be asynchronous relative to the clock and commands of the request/command sending machine and vice versa. The exchange of supervisory requests (or commands) and/or responses between the independently clocked systems need to be synchronized to the clock of the receiving unit as the commands or responses cross the boundary from the sending unit into the receiving unit. Given this, a dedicated and high-priority communications channel is conventionally provided to handle system supervisory executions and data exchanges.

The conventional approach suffers from several drawbacks. (1) Supervisory data exchanges often need to take place between a central system-supervising unit and many different and relatively far-apart circuits of the mainframe unit. As such, a space-consuming network composed of dedicated cables or interconnect lines has to be distributed throughout the mainframe unit. (2) The expansive and dedicated nature of the supervisory signal exchange network leads to a consumption of numerous interconnect pins on box connectors, printed-circuit board connectors and/or integrated circuit package connectors. The number of interconnect pins available on each type of unit are limited by physical considerations, and as such, each time an interconnect pin is dedicated for use within the supervisory signal exchange network, there is one less pin available for carrying nonsupervisory signals. (3) Dedicated memory devices are often used to hold system-supervising commands and execution results. These dedicated memory devices take away circuit space that could be otherwise used for user-function memory or other user-support functions.

SUMMARY OF THE INVENTION

The invention overcomes the above-mentioned problems by providing a scan-based method and apparatus for immediate control communications between a mainframe computer unit (MFU) and a system-supervising unit (SVP).

It so happens that the same system-supervising unit (SVP) which sends supervisory commands to the mainframe unit (MFU) is also often times used for scan-based debugging of errors in the mainframe unit (MFU). An expansive and pervasive scan network is provided within the mainframe unit (MFU) and operatively coupled to the system-supervising unit (SVP) for supporting scan-based movement of data signals between the MFU and SVP. The scan network is modified in accordance with the invention to support its usual scan operations and to also support supervisory signal exchange and execution operations. As such, the need is obviated for a separate and dedicated interconnect network to support console immediate control.

A structure in accordance with the invention comprises: a mainframe unit (MFU) and a system-supervising unit (SVP), where the mainframe unit (MFU) is clocked independently of the system-supervising unit (SVP) by a main clock generator, where the mainframe unit (MFU) has a clocked memory means that normally operates in synchronism with the main clock generator; clock turn-off means within the mainframe unit (MFU) for shutting off clocks to the clocked memory means upon the occurrence of an internal event within the mainframe unit (MFU); a scan interface interconnecting the system-supervising unit (SVP) to the mainframe unit (MFU); command sending means within the system-supervising unit (SVP) for sending a command by way of the scan interface to a command-holding area of the memory means within the mainframe unit (MFU); result-writing means within the mainframe unit (MFU) for writing, in response to the command, result data into a result-holding area of the memory means within the mainframe unit (MFU), the result-holding area being the same or different from the command-holding area of the mainframe memory; and protocol means for communicating to the system-supervising unit (SVP) by way of the scan interface that the result data had been written into a result-holding area of memory and that the system-supervising unit (SVP) can now read that result data by way of the scan interface.

A method in accordance with the invention comprises the steps of: providing a communications memory means within a first clocked system (main system); providing a protocol means within the first clocked system (main system) for indicating various communications states; providing a scan interface, operatively coupled to the communications memory means and the protocol means, for interrogating the state of the protocol means and for scanning data into or out of the communications memory means within a first clocked system (main system); coupling an external second system (SVP) by way of the scan interface to the protocol means and the communications memory means; operating the protocol means so as to indicate to the external second system (SVP) when it is permissible for the second system (SVP) to scan data into or out of the communications memory means; and further operating the protocol means so as to indicate to the first clocked system (main system) whether and/or when the external second system (SVP) has scanned data into or out of the communications memory means.

BRIEF DESCRIPTION OF THE DRAWINGS

The below detailed description makes reference to the accompanying drawings, in which.

DETAILED DESCRIPTION

Figure 1:
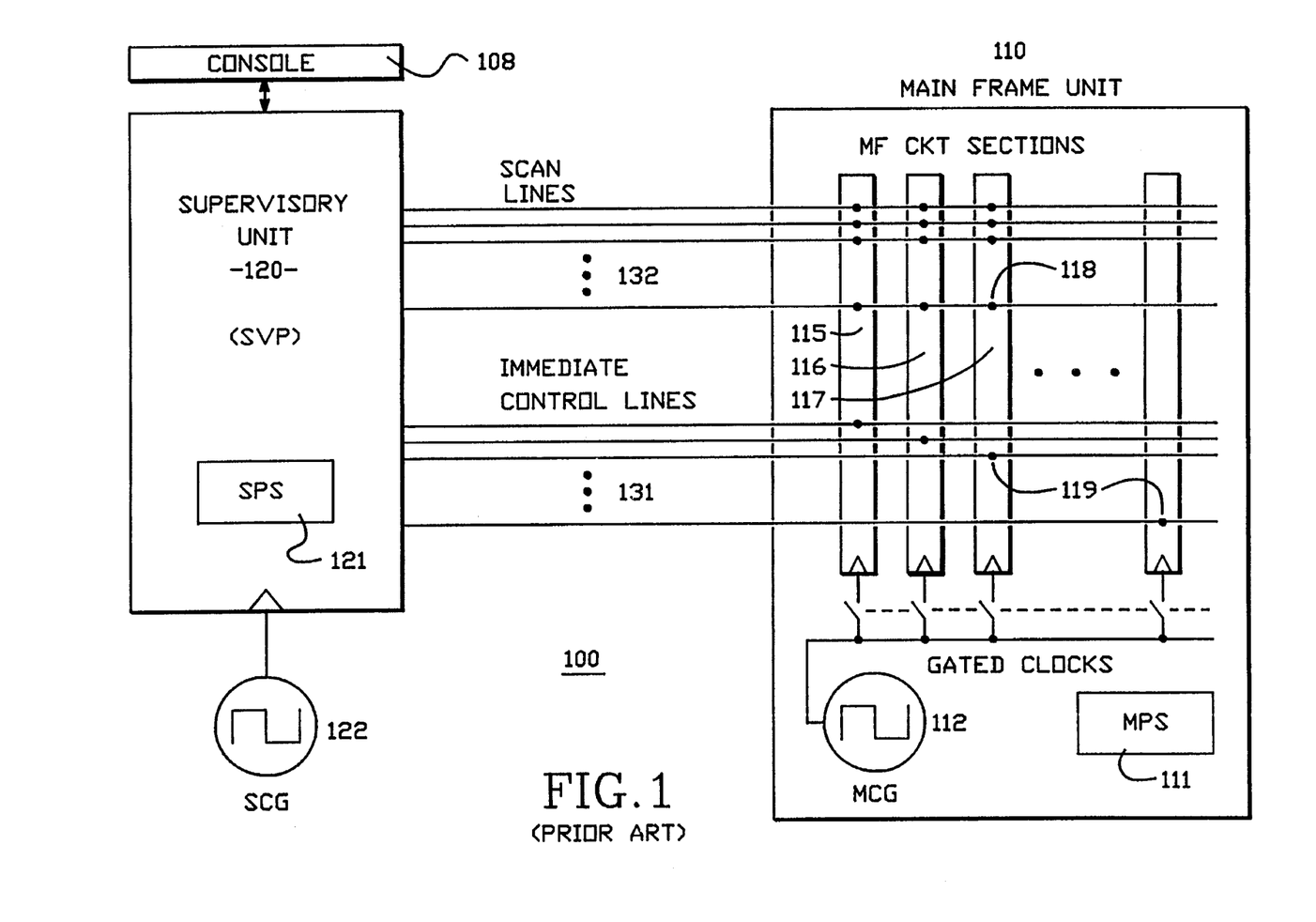
FIG. 1 is a block diagram of a previous computer system having independently powered and independently clocked main and supervisory units.

FIG. 1 is a block diagram of a previous computer system 100 (e.g., Amdahl model 5995A) composed of a mainframe unit (MFU) 110 and a system-supervising unit (SVP) 120.

For historical reasons the system-supervising unit (SVP) 120 is also referred to as the "service processor" (hence the initials "SVP") and the secondary system.

The mainframe unit (MFU) 110 is powered by a main power supply (or "MPS") 111 while the system-supervising unit (SVP) 120 is powered by an independent, secondary power supply (or "SPS") 121. The mainframe unit (MFU) 110 is clocked by a main clock generator (or "MCG") 112 while the system-supervising unit (SVP) 120 is clocked by an independent, secondary clock generator (or "SCG") 122. This is done for purposes of reliability and serviceability. The second clock generator 122 operates independently of the first clock generator 112 and typically runs at a slower frequency. The SVP 120 is preferably implemented with circuit technology that is slower, older, more mature and hence expected to be more reliable than the circuit technology employed in the MFU 110. User-specified computations take place, for the main part, in the higher speed circuitry of the MFU 110. Error logging, correction and debugging operations originate primarily from within the system-supervising unit (SVP) 120.

System supervisory actions also originate primarily from within the system-supervising unit (SVP) 120. A system operator's console 108 is provided, operatively coupled to the SVP 120, for indicating the status of various circuit sections 115, 116, 117, etc. within the mainframe unit (MFU) 110 and for allowing a system operator (not shown) to enter supervisory and/or debugging commands. Examples of supervisory commands include: (a) Display on the system console the contents of a specified memory area inside the MFU, (b) Alter the contents of a specified memory area inside the MFU by replacing it with new data supplied through the system console, (c) Display on the system console, status information on the current activity or current states of various data processing units (e.g., CPU's) and clocks within the MFU, (d) Start/stop a specified clock within the MFU, (e) Start/stop a specified instruction unit (IU) process within the MFU, and (f) Start a specified I/O channel process within the MFU.

A plurality of scan lines 132 are provided, extending from the system-supervising unit (SVP) 120 to and through the circuit sections 115, 116, 117, etc. of the mainframe unit (MFU) 110, for carrying out scan-based log outs and scan-based debugging operations when desired. Dots 118 on the scan lines 132 represent interconnect pins on the respective circuit sections 115, 116, 117, etc. that are dedicated to conducting scan signals. (Circuit sections 115, 116, 117, etc. generically represent integrated circuit chips (IC's) and/or printed circuit boards (PCB's) and/or larger size subunits of the MFU 110.)

A plurality of dedicated, immediate control lines 131 are further provided, extending from the system-supervising unit (SVP) 120 to and through the circuit sections 115, 116, 117, etc. of the mainframe unit (MFU) 110, for conducting console immediate signals between the SVP 120 and MFU 110 when desired. Dots 119 on the immediate control lines 131 represent interconnect pins on the respective circuit sections 115, 116, 117, etc. that are dedicated to conducting the console immediate signals. Note that dots 119 are shown as being uniquely assigned on a one-only basis for each of the immediate control lines 131 and each of the MFU circuit sections 115, 116, 117, etc. Note by contrast, that dots 118 are shown as being multiply assigned on a many-for-one basis to each of the immediate control lines 131 and to each of the MFU circuit sections 115, 116, 117, etc.

Generally speaking, before a scan based operation takes place over scan lines 132, the MFU-internal clock signals (also referred to as "gated clocks" because they can be turned on and off) that are supplied to the various MFU circuit sections 115, 116, 117, etc. are first turned off in order to prevent clocked latches (not shown) and/or clocked memory devices (not shown) within the MFU circuit sections 115, etc. from unexpectedly changing state while scanning takes place.

In contrast, when console immediate operations take place over immediate control lines 131, an immediate form of response is desired. The MFU-internal clock signals (gated clocks) that are supplied to the various MFU circuit sections 115, 116, 117, etc. are kept turned on so that clocked latches (not shown) and/or clocked memory devices (not shown) within the MFU circuit sections 115, etc. can immediately respond to a change of state on one of the immediate control lines 131. As a general rule, the immediate control lines 131 are connected in dedicated fashion, one to each corresponding one of MFU circuit sections 115, 116, 117, etc. as shown by dots 119. The scan lines 132, on the other hand, are typically connected in nondedicated fashion, each to a multitude of MFU circuit sections 115, 116, 117, etc. as shown by dots 118.

Given this background in the nature of scan circuits and immediate control circuits, it can be appreciated that the two kinds of circuits have in the past been thought of as being mutually exclusive of one another.

Figure 2A:
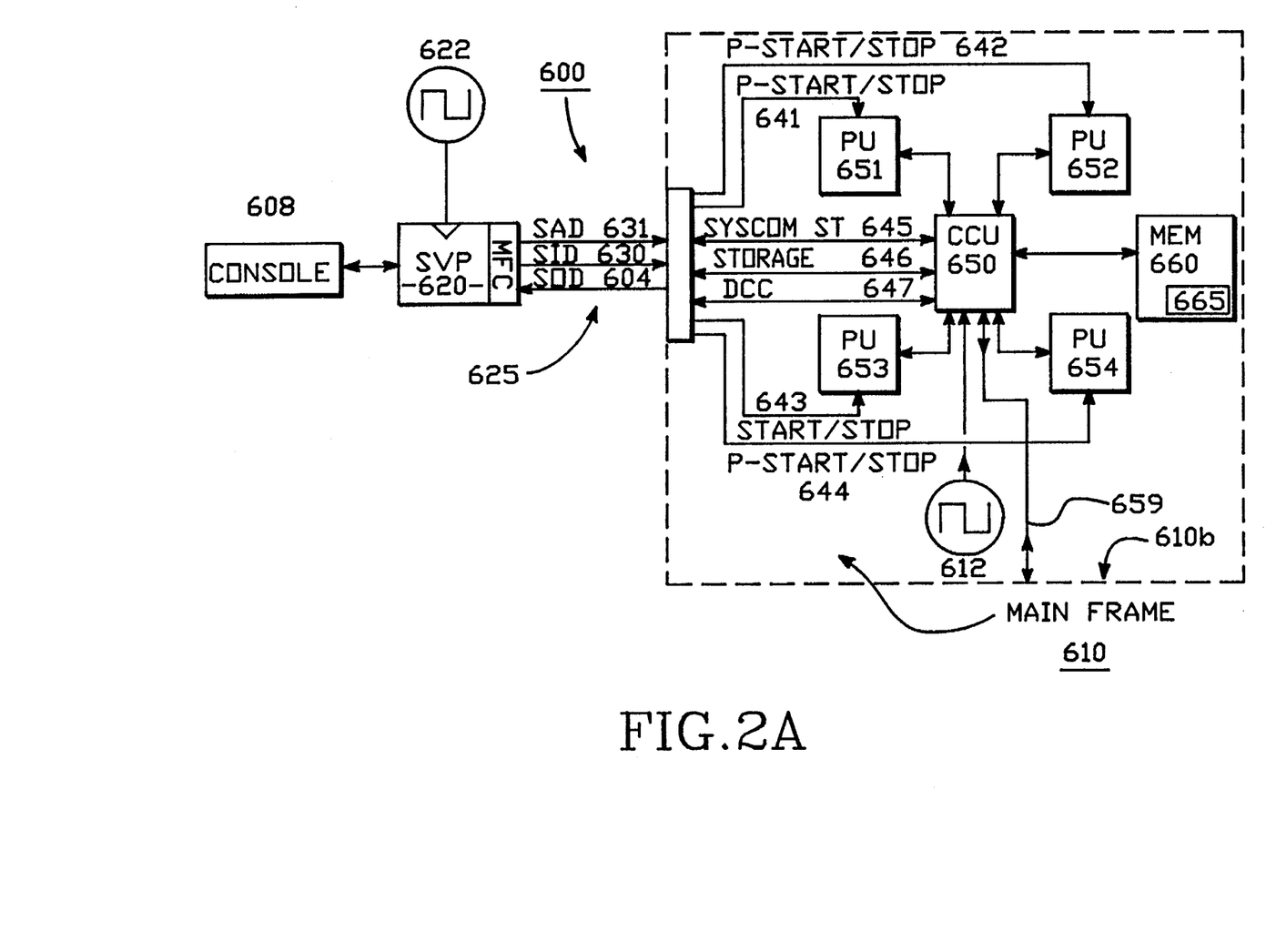
FIGS. 2A and 2B are block diagrams of a computer system in accordance with the invention which has independently clocked main and supervisory units interconnected by a scan-based communications network

Referring to FIG. 2A, a block diagram of a structure 600 having a mainframe unit and a supervisory unit in accordance with the invention is shown. Like reference numbers within the '600' series are used in FIG. 2A for elements having like counterparts numbered in the '100°' series in FIG. 1.

Structure 600 comprises a multi-processor mainframe computer (main system) 610 whose operations are synchronized to pulses generated by a main clock generator 612. Structure 600 further comprises a service processor or 'SVP' 620 (second system) whose operations are synchronized to pulses generated by a second clock generator 622. The SVP 620 includes a mainframe control interface (MFC) for interfacing with the mainframe computer 610.

The second clock generator 622 operates independently of the first clock generator 612 and typically runs at a much slower frequency. In one embodiment, the first clock generator 612 has a 7 nanosecond period (7 nS) while the second clock generator 622 operates with a 50 nS period.

A system console 608 couples through the service processor 620 to the mainframe 610. System operators can send console commands to the mainframe 610 through this coupling. System operators can also direct error isolation processes which are executed from the SVP 620 by way of the system console 608.

The mainframe computer 610 (also referred to as 'MF' hereafter) includes a central control unit (CCU) 650 which couples to four surrounding processor units (PU's) 651, 652, 653 and 654.

The mainframe 610 also includes a central memory unit (MEM) 660 which couples to the CCU 650 and is used for storing system data.

The PU's 651–454 access data in the memory unit 660 through configurable data paths defined in the CCU 650. (CCU 650 includes a programmable crossbar router referred to as the System Data Switch or SDS for short.)

Each of processor units (PU) 651–654 of FIG. 2A has a pipelined architecture which allows it to concurrently process a stream of overlapping micro-instructions. At any one time, each of PU's 651–654 can be executing parts of independent software routines or exchanging data belonging to interrelated software routines through the common memory unit 660.

At the same time, system support processes such as parity checking, logic correctness checking, address boundary checking, read/write protect and so forth execute within the mainframe 610 side by side with the execution of concurrently running software programs.

Each of the concurrent support processes and software programs can require interaction with the service processor 620 at any given time. For example, if a fault develops within the mainframe 610 and it is determined that the fault can be circumvented by altering certain data or reconfiguring certain data paths within the MF 610, a fault detecting part (not shown) of the MF 610 may ask the SVP for assistance in making such corrections.

Figure 2B:
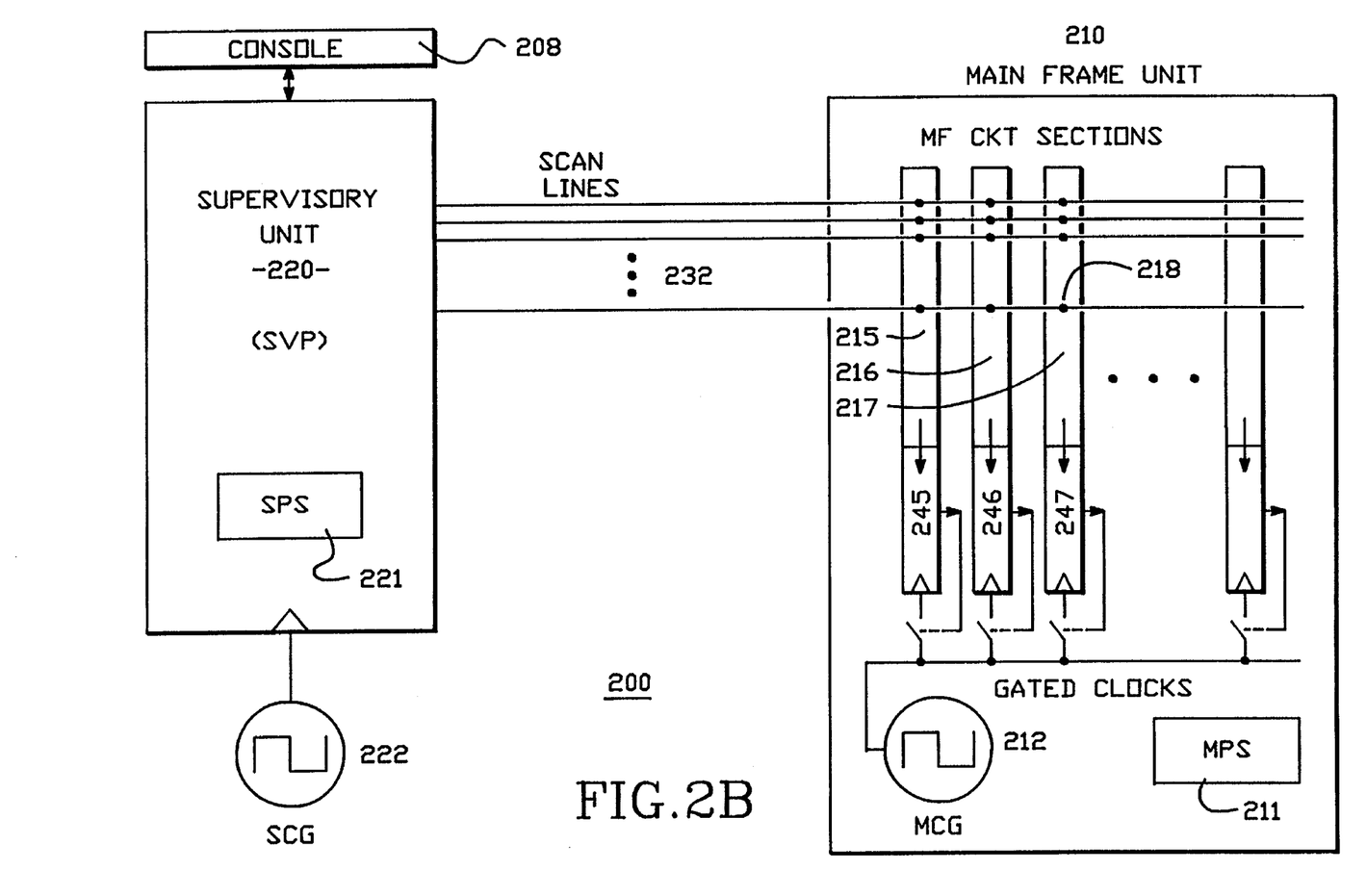

Before we proceed to FIG. 2B, a more detailed description of the service processor's (SVP 610) operations will be helpful in understanding how MF-to-SVP interactions take place.

The service processor (SVP) 620 connects to a large number of prespecified monitor points and a large number of scan latches (not shown) within the mainframe 610 by way of its mainframe control interface (MFC) and a scan bus 625 which couples the MFC to all circuits within the mainframe 610. The scan bus connections are primarily provided for isolating and debugging chip-level faults within the mainframe. But they also provide a highway by which any one part of the mainframe 610 can use the SVP as an intermediary for communicating with any other part of the mainframe 610.

The scan bus 625 carries scan address data (SAD) 631 for addressing each of the prespecified points or scan latches within the mainframe 610, scan input data (SID) 630 for setting or resetting desired ones of the scan latches within the mainframe 610, and scan output data (SOD) 604 representing the states of addressed ones of the monitor points within the mainframe 610.

The SVP 620 can observe the states of all monitor points within the mainframe at any time, irrespective of whether the mainframe clocks are running or not. This is done by addressing those points over the scan bus (using SAD 631) and collecting the returned scan output data, SOD 604. Generally speaking, the behavior of the mainframe 610 is not changed by the input of a scan address (SAD 631) from the SVP 620, into the MF 610, for the purpose of monitoring levels at a monitor point.

Certain of the scan latches (clocked scan latches) within the mainframe 610 can be determinatively controlled by the SVP only when the delivery of system clock pulses 611 to such scan latches is suppressed. Others of the mainframe scan latches (Operating State Latches or OSL's for short) are nonclocked and can be set or reset by the SVP 620 even while mainframe clocks are running. Details about the scan system may be found in the above cited U.S. patent application Ser. No. 07/670,289 entitled SCANNABLE SYSTEM WITH ADDRESSABLE SCAN RESET GROUPS, by Robert Edwards et al, which is incorporated herein by reference.

Some of the clocked latches and nonclocked scan latches (OSL's) in the mainframe define service-processor-to-mainframe intercommunication buffers (referred to hereafter also as SVP-MF buffers). The SVP 620 can read out the contents of any one or more of these buffers while mainframe clocks are running without changing the timing of tasks that are concurrently executing in the mainframe.

A first subset of the SVP-MF latches define so-called PU start/stop registers which allow the SVP 620 to issue respective console start/stop commands 641–644 to individual ones of the processor units 651–654. The console start/stop commands 641–644 are used to transition each corresponding PU between 'operating' and 'stopped' states.

System clock pulses 611 are still supplied to the MF 610 when one of its PU's 651–654 transitions to a console-stop state. But, transitioning between the operating state and stop state requires orderly synchronization with other machine states. The SVP 620 interacts with the mainframe clock control to provide an orderly transition between the PU operating and stopped states.

One or more of the PU's 651–654 can continue to run in an 'operating' state and send requests to the SVP 620 while one or more of the other PU's 651–654 is stopped. The console start/stop states (brought about through control interfaces 641–644) are to be distinguished from clock stop/start commands which turn all main system clock pulses (611) off so that the entire mainframe 610 is frozen in a particular state.

A second subset of the SVP-MF latches define so-called SYSCOM buffers which are used to transfer messages between the SVP 620 and the SYSCOM queues area 665 of the central memory 660. These latches allow immediate message exchanges to take place between the SVP 620 and the CCU 650 while the mainframe 610 continues to receive system clock pulses 611. One example of a SYSCOM buffer exchange is where the CCU 650 sends a request to the SVP 620 asking for assistance in sending a console stop command 641–644 to a particular one or more of the PU's 651–654.

SYSCOM messages can shuttle from the CCU 650 to the SVP 620 or vice versa. A copy of these messages is maintained in queues area 665. A data-valid handshake mechanism is used in each message transfer.

During SYSCOM transfers in which the SVP 620 sends messages to the CCU 650, the SVP sets one of a first set of data-valid OSL's to indicate to the CCU 650 that the SVP has loaded a message for the CCU into a particular SYSCOM buffer within area 665.

FIG. 2B is a block diagram of a computer system 200 in accordance with the invention. The inventors have recognized, that with appropriate handshaking and responsive self-controlled gating of clocks to the various MFU circuit sections, it is possible to use a shared interconnect network for carrying both scan signals and immediate control signals.

Like reference symbols and numbers in the "200" series are used for elements of FIG. 2B which correspond to but are not necessarily the same as the elements represented by similar symbols and reference numbers of the "100" series in FIG. 1. As such, an introductory description of the elements found in FIG. 2B is omitted here.

It is to be instantly noted that the immediate control lines 131 of FIG. 1 are absent in the embodiment 200 of FIG. 2B. Interconnect pins 119 of FIG. 1 are also absent in the embodiment 200 of FIG. 2B. A savings is realized in the number of cables and interconnect pins that are used to support the combined functions of scanning the mainframe unit (MFU) 210 and conducting immediate control operations between the system-supervising unit (SVP) 220 and the MFU 210. A savings is also realized in the number of serviceability, reliability and other problems that accompanied the previous, more heavily cabled, embodiment 100 (FIG. 1).

Console immediate commands that are entered from console 208 are carried by scan lines 232 to circuit sections 215, 216, 217, etc. of mainframe unit (MFU) 210. Each of MFU circuit sections 215, 216, 217, etc. includes a corresponding immediate-control subsection, 245, 246, 247, etc. which is operatively coupled to a respective scan pin 218 of its circuit section 215, etc. and which responds to certain handshake signals (not shown) carried over the scan lines 232. One of the responses of each immediate-control subsection, 245, 246, 247, etc. to the protocol signals carried over scan lines 232 is to selectively gate off or reconnect the MFU clock signals (212) which normally clock its respective circuit section 215, 216, 217, etc.

A more detailed explanation will be given shortly in conjunction with FIG. 3. It is to be noted beforehand that the computer system 200 shown in FIG. 2B enjoys the advantages over that shown in FIG. 1 of not having as many interconnect lines between the SVP 220 and MFU 210 and not having pins 119 within the MFU 210 that are dedicated to servicing console immediate commands. In one particular embodiment 200 of the previous system 100 the immediate control lines 131 had approximately 50 or more wires and the scan lines 132 where comprised of a separate number of wires of like magnitude. On the other hand, in a corresponding embodiment 200 of the invention, a common set of wires is used to carry out the dual functions of supporting scan operations and immediate control operations. Nonetheless, the corresponding embodiment 200 of the invention has an immediate control throughput substantially equal to or better than the previous system 100 that had separate immediate control lines 131 and separate scan lines 132.

Figure 3:
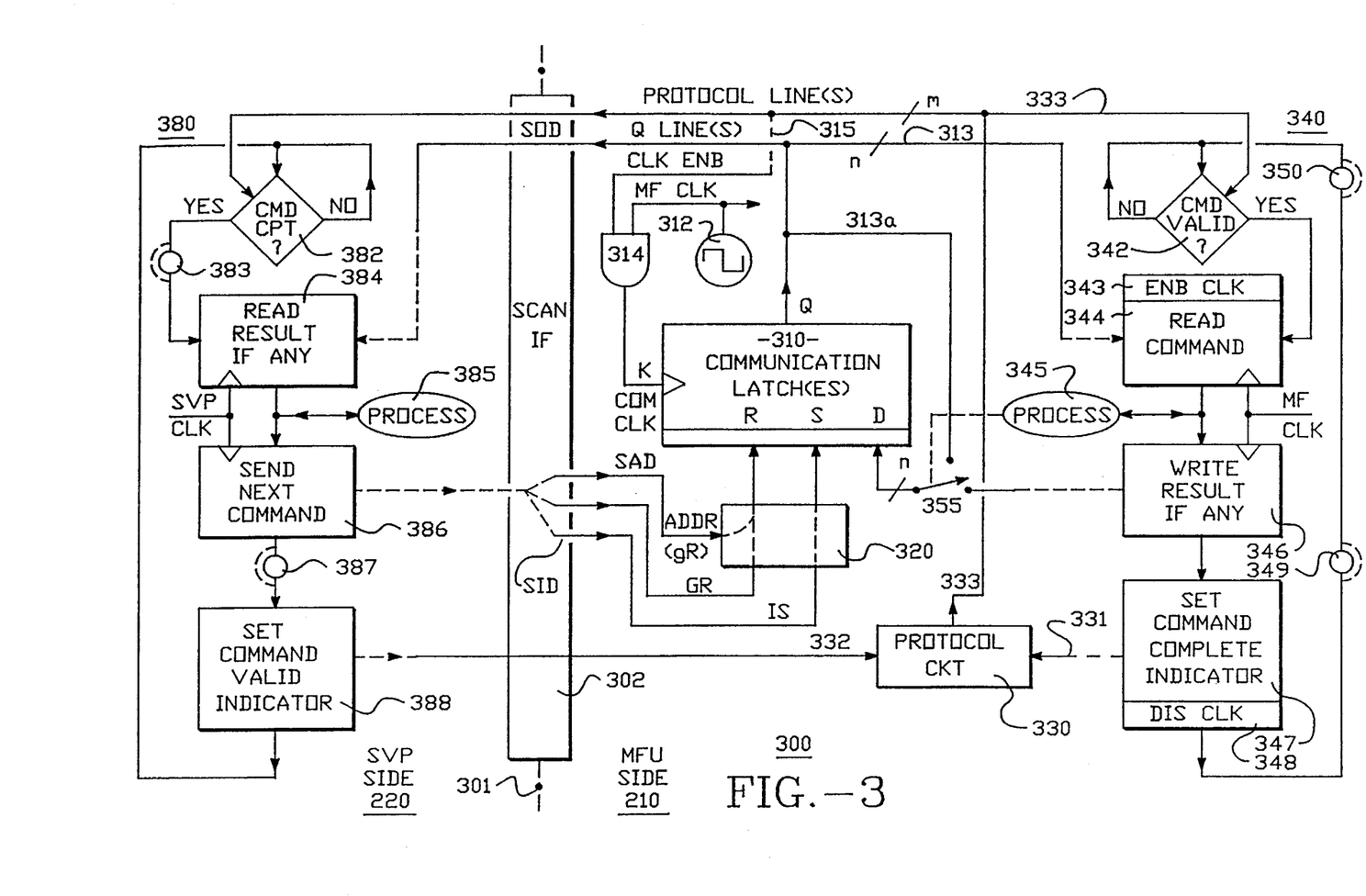
FIG. 3 is a combination logic flow diagram and circuit schematic diagram illustrating a scan-based portion of a supervisory signal exchange network in accordance with the invention.

Referring to FIG. 3, an embodiment 300 of one of the immediate control subsection, 245, 246, 247, etc. is shown in more detail together with supporting handshake means within the SVP 220 and MFU 210.

FIG. 3 is a combination logic flow chart and circuit schematic. Logic performing means and/or circuitry within the SVP 220 are shown on the left side and logic performing means and/or the circuitry within the MFU 210 are shown on the right side of dividing line 301.

Box 302 represents a scan interface (IF) that permits scan control circuitry (not specifically shown) within the SVP 220 to address any one of a plurality of scannable points within the MFU 210 and to read the state (binary "1" or "0") of the addressed point. Binary state signals that are so read out from the MFU 210 are referred here as scan out data (SOD). Although not shown in FIG. 3, it is to be understood that scan interface 302 includes the scan lines 232 that connect the SVP 220 to the MFU 210.

The scan interface 302 further permits scan control circuitry (not specifically shown) within the SVP 220 to address any one of a plurality of scan-addressable latches (flip flops, registers and/or memory devices) within the MFU 210 and to set the state of the individually addressed latch to a binary "1".

The scan interface 302 additionally permits scan control circuitry (not specifically shown) within the SVP 220 to address any one of a plurality of scan-addressable "reset-groups" within the MFU 210 where each reset-group is composed of one or more latches (flip flops, registers and/or memory devices) and to reset the states of the latches in the addressed reset-group to a binary "0". Binary state signals that are so input into the MFU 210 are referred here as scan input data (SID). Binary state signals that are generated in the SVP 220 and applied into the MFU 210 for addressing specific scan-out points, or specific latches to be set, or specific latch groups to be reset, are referred to here as scan address data (SAD).

A detailed description of a circuit scheme which allows points and latches to be addressed and respectively read by scanning and set or reset by scanning is provided in the above cited U.S. patent application Ser. No. 07/670,289 entitled "SCANNABLE SYSTEM WITH ADDRESSABLE SCAN RESET GROUPS" by Robert Edwards et al, which was filed Mar. 15, 1991, now U.S. Pat. No. 5,271,019, and incorporated herein by reference. As such, a description of the circuit scheme will not be repeated here.

A detailed description of an information exchange scheme which allows command signals to flow between independently clocked systems and still maintains deterministic behavior in at least one of those systems is provided in the above cited U.S. patent application Ser. No. 07/814,389 entitled "METHOD AND APPARATUS FOR MAINTAINING DETERMINISTIC BEHAVIOR IN A FIRST SYNCHRONOUS SYSTEM WHICH RESPONDS TO INPUTS FROM NONSYNCHRONOUS SECOND SYSTEM", by James P. Millar et al, which was filed Dec. 26, 1991, now U.S. Pat. No. 5,297,276, and incorporated herein by reference. As such, a description of the determinism-maintaining scheme will not be repeated here.

One key feature provided by the SCANNABLE SYSTEM WITH ADDRESSABLE SCAN RESET GROUPS, of Robert Edwards et al, is the ability to quickly write a pattern of binary ones and zeros ("1's" and "0's") into an addressed group of latches. This feature is useful for implementing a scan-based immediate control system having a sufficiently fast response time.

FIG. 3 shows a group of latches 310 composed of a nonzero number, n, of latches. The group of n latches is referred to here as the communications latch group 310. (In a minimized embodiment, n can be equal to one and group 310 can then consist of just one latch that holds a single intercommunication bit, but such an embodiment is considered of little benefit. In more preferred embodiments n will be equal to the number of bits in a message burst of practical length. Examples are n=8, n=16, n=32, n=64 and so forth.)

Each latch (not individually shown) in the group of n communications latches 310 has a D-input for receiving binary data that is synchronized to a mainframe clock (MF CLK) 312 and a Q-output for outputting binary data in synchronism with the mainframe clock (MF CLK) 312. Each communications latch of group 310 also has a clock input (K) for receiving a gated version (COM CLK) of mainframe clock (MF CLK) 312. When the clock input (K) is receiving clock pulses from a clock-enabling gate 314, the Q-output of each communications latch is equal to the binary state ("1" or "0") applied to its D-input one clock cycle before. When the clock input (K) is not receiving clock pulses, the Q-output of each communications latch remains in its latest state unless overridden by a set or reset command applied to respective S and R inputs of that communications latch. If a logic high ("1") is applied to the S-input (set) of a communications latch, its Q-output is set to the logic high ("1") state. If a logic high ("1") is applied to the R-input (reset) of a communications latch, its Q-output is reset to the logic low ("0") state.

An addressable set/reset means 320 is provided, preferably in accordance with the scheme disclosed in the above-cited patent application of Edwards et al, for selectively setting and resetting the communications latches of group 310. The preferred set/reset means 320 has an address input (ADDR) for receiving scan address data (SAD) from the scan interface 302, a global reset input (GR) for receiving a global reset command from the scan interface 302, and an individual set input (IS) for receiving commands to set individually addressed ones of the communications latches 310. A special address value is reserved as a group reset (gR) code for communications latches 310. When the special address value (gR) is detected by the set/reset means 320, the set/reset means 320 issues reset commands to the R-inputs of all the latches in communications latch group 310. When the address of a specific latch in group 310 is detected by the set/reset means 320 and the IS input is at logic high ("1"), the set/reset means 320 sends a set command to the S-input of the addressed latch. (Also when a global reset GR is received, the set/reset means 320 will send reset commands to all latches of its group 310. The special address value reset (gR) and global reset (GR) are in essence ORred together within the set/reset means 320.)

While not shown, it is to be understood that MFU 210 is preferably provided with a plurality of communications latch groups like group 310, where each group has its own unique address value (gR) reserved for resetting that group and the individual latches of each group are individually setable by other unique address values. The below description of methods for loading commands or requests from the SVP 220 by way of the scan interface 302 into latch group 310, of responsively executing the commands or requests within the MFU 210, and of returning result data from the communications latch group 310 by way of scan interface 302 back to the SVP 220 applies to the other communications latch groups that are not shown.

It will be seen that a methodology and means are provided below for quickly loading any group of communications latches (310 or another) by way of the scan interface 302 with a desired pattern of bits originating as scan input data (SID). A methodology and means is also provided for indicating to a desired circuit portion of the MFU 210 that a valid command or request has been loaded into one of its communications latch groups (310 or another) by way of the scan interface 302. (The desired circuit portion of the MFU 210 that is to respond to the command is specified by addressing an associated one of the communications latch groups.) A methodology and means is further provided for letting the request/command receiving portion of the MFU read the request/command from the communications latch groups (310 and/or another), process the request/command, and if necessary, write result data back into the communications latch groups (310 and/or another). A methodology and means is additionally provided for letting the request/command sending portion of the SVP know that the request/command receiving portion of the MFU has received and executed the request/command, and where applicable, that the request/command sending portion of the SVP is now permitted to scan the result data out from the affected communications latch groups (310 and/or another).

To speed the transmission of a request/command from the system-supervising unit (SVP) 220 to the MFU 210, the desired (pre-specified) communications latch group (310 or another) is first cleared, either by global reset (GR) or a group-specific reset (gR) and a desired pattern of logic ones ("1") is then loaded into desired individual ones of the communications latches. However, because the mainframe unit (MFU) 210 and the system-supervising unit (SVP) 220 are operating asynchronously with respect to each other's clock (212 and 222, see FIG. 2) it preferable to stop local clocks within a request/command receiving portion of the mainframe unit (MFU) 210 before the SVP 220 attempts to write data into that section or read data out of that section. To that end, a handshake system is provided with a protocol that allows the mainframe unit (MFU) 210 to shut off, on its own initiative, the COM CLK pulses applied to the clock (K) inputs of the specified latch group or groups (310 and/or others, not shown) so that the SVP 220 can then safely read from and/or write into the specified latch group (310 or another) without worry that an MFU clock pulse will come along and alter the data of that latch group. The handshake system further allows the SVP 220 to indicate to the MFU 210 when the SVP 220 has completed writing a request/ command into the latch group (310 or another). The handshake system additionally allows the MFU 210 to indicate to the SVP 220 when the MFU 210 has completed writing result data into the latch group (310 or another).

A protocol circuit 330 is provided in the mainframe unit (MFU) 210 for driving a set of m protocol lines 333 and indicating on the m protocol lines 333 that a command valid (CMD VAL) condition exists or that a command complete (CMD CPT) condition exists for some command processing circuit 345 within the MFU 210 and its corresponding communications latch group (310 or another).

In one embodiment, m is equal to at least two lines per corresponding latch group 310 and the command valid (CMD VAL) condition and the command complete (CMD CPT) condition are indicated independently of one another. In another, more preferred embodiment, m is equal to one line per corresponding latch group 310 and the command valid (CMD VAL) condition and the command complete (CMD CPT) condition for the corresponding latch group (e.g., 310) are indicated on a mutually exclusive basis on that one protocol line. (CMD CPT is the binary complement of CMD VAL).

When command complete (CMD CPT) is indicated to be true on the protocol line(s) 333, such a condition indicates that some command processing circuit 345 (not specifically shown) within the mainframe unit (MFU) 210 has disabled the clock-enabling gate (AND gate) 314, thereby shutting off the supply of clock pulses to its corresponding latch group 310, and that the MFU processing circuit 345 has perhaps left behind a message in the communications latch group 310 which the SVP 220 can now safely read (without worry that it will change) by way of the scan interface 302.

When command valid (CMD VAL) is indicated to be true on the protocol line(s) 333, that condition indicates that the system-supervising unit (SVP) 220 has finished using the corresponding communications latch group 310 and perhaps written a command into the communications latch group 310, and that it is now safe for some processing circuit 345 (not specifically shown) within the mainframe unit (MFU) 210 to enable the clock-enabling gate (AND gate) 314 and thereby turn back on the supply of clock pulses to the corresponding latch group 310. The true command valid (CMD VAL) condition can also indicate that some command producing circuit 385 (not specifically shown) within the SVP 220 has left behind a next command in the communications latch group 310 which the MFU 210 can now safely read (without worry that it is not yet valid). The request/ command receiving portion of the MFU reads the request/ command left behind in its corresponding communications latch group (310 or another) by way of a direct connection 313 made from the Q-outputs of the latch group (310 or another) to the request/command receiving portion of the MFU.

As seen in the flow-chart 380 at the left side of FIG. 3, a software and/or hardware means 382 within SVP 220 is provided to detect a true command complete (CMD CPT) condition on the protocol line(s) 333 of a given communications latch group (310 or another) by scanning out (as SOD signals) the state of the corresponding protocol line(s) 333 through the scan interface 302. The command complete detecting means 382 waits until a true command complete (CMD CPT) indication is detected on the protocol line(s) 333. Once a command complete (CMD CPT) is true indication is detected for a specific communications latch group (e.g., 310), the next step 383 is optionally taken. In a so-called 1-wire system (described in more detail below) step 383 is bypassed and a result reading means 384 reads a result, if any, that might have been stored in the specified communications latch group (310) by scanning out (as SOD signals) the state of the corresponding Q-output lines 313 of the specified latch group (310) using the scan interface 302. In a so-called 2-wire protocol system, step 383 sends a "reset command valid" signal (not shown) to a protocol circuit 330 by way of the scan interface 302 while or after result-reading means 384 reads the result in order to indicate to the mainframe unit (MFU) 210 by dropping command valid (CMD VAL) to logic low ("0") that the SVP 220 is-reading or has-read the result data. The MFU 210 acknowledges this in the 2-wire system by responsively dropping the command complete (CMD CPT) indication to logic low ("0") in a later-described step 350.

After the result, if any, has been scanned out of the MFU 210, a software and/or hardware command producing circuit 385 within the SVP 220 begins to execute a command-producing process in response to the detection by the command-complete detecting means 382 of a true command complete (CMD CPT) indication, and optionally in response to the result data that had been scanned out from the latch group 310 by the result-reading means 384. The command producing circuit 385 formulates a next command which it then sends out to a specified communications latch group (e.g., 310) by way of a command sending unit 386, scan interface 302 and set/reset means 320.

Note that the result-reading means 384, the command-producing circuit means 385, and the command sending unit 386 operate asynchronously relative to the mainframe clock (MF CLK) 312. Typically, units 384, 385 and 386 will be synchronized to the SVP clock (222) and the SVP clock (222) will be typically operating at a frequency that is substantially lower than the frequency of the mainframe clock (MF CLK) 312.

The command-sending unit 386 within SVP 220 preferably loads the specified communications latch group (e.g., 310 or another, not shown) using the expedited group reset scheme discussed above. The command-sending unit 386 first outputs a special group reset address (gR) by way of the scan interface 302 and the set/reset means 320 to reset the latches of the specified communications latch group (e.g., 310 or another, not shown). The command-sending unit 386 then outputs unique latch addresses and individual set (IS) commands, again by way of the scan interface 302 and set/reset means 320, to establish a desired pattern of logic ones and zeroes in the specified communications latch group (e.g., 310 or another). The resultant pattern of logic ones and zeroes in the specified communications latch group (e.g., 310 or another) then define a specific command (e.g., a display memory command or an alter memory command, to be described below) that is to be executed by a corresponding request/command receiving portion (345) of the MFU.

After the command-sending unit 386 completes its task and/or it is safe to assume that the command bits sent to the specified communications latch group (e.g., 310 or another) have settled into a stable, valid state, a command-valid setting means 388 within the SVP 220 sends a "set command valid" signal 332 by way of the scan interface 302 to the protocol circuit 330. The protocol circuit 330 responds by indicating a command valid (CMD VAL) is true condition on the corresponding protocol line(s) 333 of the affected communications latch group (310).

In the 2-wire system, a waiting step 387 is interposed between steps 386 and 388. In step 387, the SVP 220 waits for the MFU 210 to reset the command complete (CMD CPT) indicator to logic low ("0"). The MFU 210 does in a later-described step 350 of the 2-wire system.

After the set valid step of command-valid setting means 388 completes, control in the flow of left flow chart 380 returns to the command-complete detecting means 382 which polls the protocol line(s) 333 by way of the scan interface 302, and waits for a next command complete (CMD CPT) indication for either communications latch group 310 or another communications latch group (not shown).

A right side flow chart 340 shows that a counterpart operation takes place in the mainframe unit (MFU) 210. A software and/or hardware means 342 within MFU 210 is provided to detect a true command valid (CMD VAL) condition on the protocol line(s) 333 of a given communications latch group (310 or another) by polling the protocol line(s) 333 through a direct connection. The command-valid detecting means 342 waits until a true command valid (CMD VAL) indication is detected on protocol line(s) 333. Once the command valid (CMD VAL) indication is detected for a specific communications latch group (e.g., 310), a command-reading means 344 reads the command that has been stored in the specified communications latch group (310) directly off the Q-output lines 313 of the specified latch group (310).

Typically, before the command-reading means 344 begins to read the pre-stored command from the specified communications latch group (310), a clock enabling step 343 will be executed in which a clock enable (CLK ENB) level is applied to clock-enabling gate 314 in order to start supplying MF clock pulses to clock (K) input of the communications latch group 310. In one embodiment, the command valid (CMD VAL) indication on the protocol line(s) 333 is used directly as the CLK ENB level. This is indicated by dashed connection 315. In another embodiment, the CLK ENB level is generated by the command-valid detecting means 342 or the command-reading means 344 in response to the command valid (CMD VAL) indication.

The request/command stored in latch group 310 can be read out immediately in synchronism with the first pulse of the enabled COM CLK signal, or in cases where a request/command executing portion 345 is not yet ready to process the data, a data recycling switch 355 can be thrown, ahead of time, by the executing portion 345 to cycle the Q-output of latch group 310 by way of loop 313a back to its D-input. (In an alternative approach, not shown, a third input terminal is provided on clock-enabling gate 314 and the not-ready process 345 places a logic low ("0") on that third input terminal in order to keep the contents of latch group 310 frozen until unit 345 is ready to process those contents.)

The software and/or hardware-implemented request/command executing portion 345 of the MFU begins to execute the requested/commanded process in response to the request/command read out of the latch group 310 by the command-reading means 344. The request/command executing portion 345 formulates a block of result data which it then sends out to a specified communications latch group (e.g., 310) by way of a result sending unit 346. Data recycling switch 355 is operated to let the result sending unit 346 write the result data into the D-inputs of the communications latch group 310. Note that the command-reading means 344, the command-executing circuit means 345, and the result sending unit 346 operate asynchronously relative to the system-supervising unit (SVP) 220 and in synchronism with the mainframe clock (MF CLK) 312.

After the result-sending unit 346 completes its task and/or it is safe to assume that the result bits sent to the specified communications latch group (e.g., 310 or another) have settled into a stable, valid state, a command complete setting means 347 sends a "set command complete" signal 331 to the protocol circuit 330. The protocol circuit 330 responds by indicating a true command complete (CMD CPT) condition on the protocol line(s) 333.

At or before the time that the "set command complete" signal 331 is sent, a disable clock step 348 is executed by the MFU hardware. The disable clock step 348 forces the CLK ENB line of clock-enabling gate 314 low, thereby halting the supply of MF clock pulses to the K-input of the latch group 310 and freezing the data that has been there by the result sending unit 346.

After the "set complete" step of command-complete setting means 347 finishes, control in the flow of right flow chart 340 returns to the command-valid detecting means 342 which polls the protocol line(s) 333 and waits for a next command valid (CMD VAL) indication.

In the 2-wire system, steps 349 and 350 are interposed into the return loop from step 347 to step 342. (The 1-wire system does not include steps 349 and 350.) At step 349, the MFU 210 polls the protocol lines 333 waiting for the SVP 220 to drop command valid (CMD VAL) to logic low ("0"). The SVP 220 does this in step 383 of the 2-wire system. In response to the drop of command valid (CMD VAL), the MFU 210 proceeds to step 350 where the MFU 210 sends a "reset command complete" signal (not shown) to the protocol circuit 330 and thereby resets the command complete (CMD CPT) indicator to logic low ("0"). This dropping of command complete (CMD CPT) lets the SVP 220 step through waiting step 387.

Figure 4A:
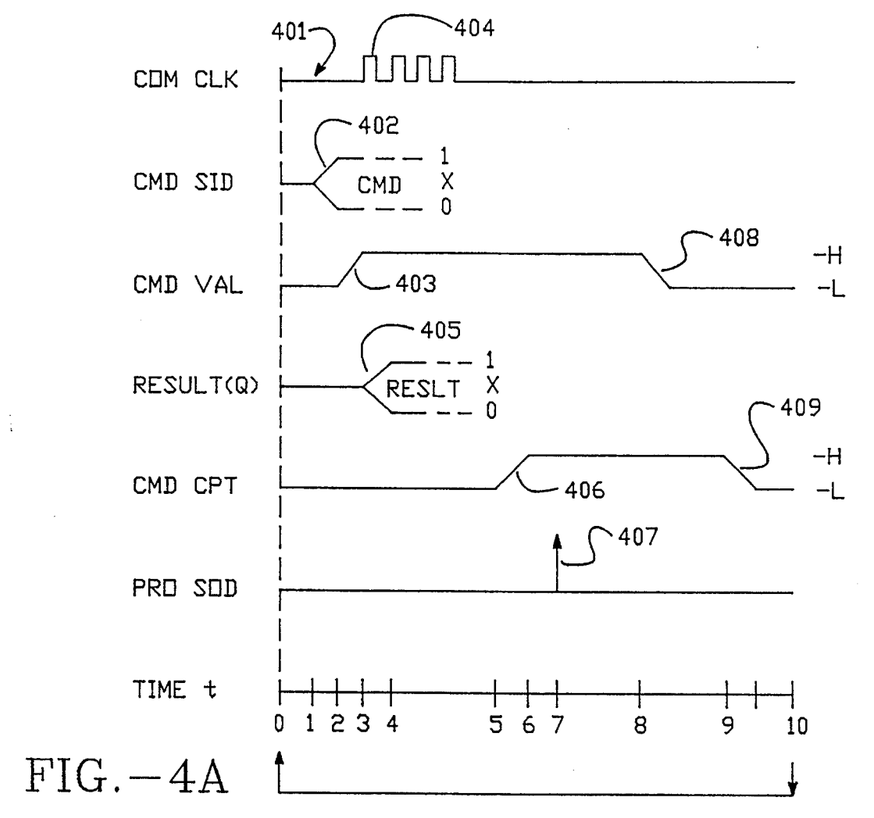
FIG. 4A is a combined timing diagram and flow chart showing a handshake protocol for a 2 wire system.

FIG. 4A is a combined timing diagram and flow chart showing a handshake protocol for the two wire system. In the 2-wire system, command complete (CMD CPT) and command valid (CMD VAL) are indicated on two independent ones of protocol lines 333. While FIG. 3 gives the impression that results are always written back into the communications latch group 310 that received the request/command from the system-supervising unit (SVP) 220, it is to be understood that this not always the case. (See FIG. 5A.) The mainframe unit (MFU) 210 can be designed with separate command-holding and result-holding latch groups. One group receives commands from the SVP 220 while the other returns corresponding results back to the SVP 220. The command valid (CMD VAL) indication signals to the MFU 210 that a valid command has been entered into one of its command receiving areas (e.g., 504 of FIG. 5A) and the command complete (CMD CPT) indication signals to the SVP 220 that a valid result has been entered into one of the result-holding areas (e.g., 584 of FIG. 5A) within the MFU 210.

In FIG. 4A, the CLK ENB line is at logic low ("0") at time point $t=t_0$ and the clock-enabling gate 314 is blocking COM CLK clock pulses from reaching the K-input of a clocked command-holding latch group such as 310. The absence of clocks is indicated at 401. The command valid (CMD VAL) indicator is at logic low ("0") at time point $t=t_0$ and the command complete (CMD CPT) indicator is at logic low ("0"). Under this condition, the SVP 220 is permitted to scan-in a new command into the latches of group 310 without worry that the contents of latch group 310 will be altered by the mainframe clock (MF CLK) 312.

At time point $t=t_1$, the command-sending unit 386 of the SVP 220 starts sending a new or next command by way of the scan interface 302 and the set/reset means 320 into a specified communications latch group (310 or another) as indicated on the line marked CMD-SID. The midlevel line marked "x" between time points $t=t_0$ to $t_1$ represents don't-care values of set/reset commands sent out through the scan interface 302 from the SVP 220 to the MFU 210. At time point $t=t_1$, the special address value (gR) is sent out to clear the communications latch group that is to receive a command (310 or another). The angled lines 402 expanding to the "1" and "0" levels of the CMD-SID graph of FIG. 4A represent the establishment of a desired pattern of ones and zeroes in the various latches of the target latch group (310 or another).

At time point $t=t_2$, the pattern establishing process completes and a valid command (CMD) resides in the target latch group (310 or another). Note that from time point $t=t_0$ up to a next-described time point $t=t_3$, no COM CLK clock pulses are supplied to the K-input of the result-holding latch group and the target latch group that is to receive the new/next command. (In the case of FIG. 3, communications latch group 310 can serve both functions.) The command that is loaded into the target latch group (e.g., 310) at time point $t=t_2$ is therefore held unchanged up to the next-described time point $t=t_3$.

At or between time points $t=t_2$ and $t_3$, the SVP 220 raises 403 the command valid (CMD VAL) indicator associated with the target latch group to logic high ("1") with the establishment of the valid command at time point $t=t_2$, or a short time later (at time point $t=t_3$).

The MFU 210 detects the command valid (CMD VAL) indication 403 and in response, raises the CLK ENB line high to turn on the COM CLK clock pulses as indicated at 404. Under this condition, the synchronous hardware within the MFU 210 that is coupled to the D-inputs and Q-outputs of latch group 310 can use the latches of group 310 in the same manner as any other latches which are clocked by the mainframe clock (MF CLK) 312. The MFU can read data out of latch group 310 and thereafter use latch group 310 as an accumulator for storing temporary information and afterwards as a result-holding area for storing final result data. The CLK ENB line remains high as long as required by the request/command executing portion 345 of the MFU.

At time point $t=t_4$, the first pulse of the COM CLK clock pulses will have entered the latch group 310 and the MFU 210 could have written a complete result back into the latch group 310 as early as this time. Completion of the result-writing step 405 or some later internal event within the mainframe unit (MFU) 210 triggers the disable clock step 348 and the command-complete setting step of means 347 (FIG. 3).

At time point $t=t_5$ when the last COM CLK clock pulse is supplied to latch group 310 or a short time thereafter, at time point $t=t_6$, the MFU 210 raises the command complete (CMD CPT) indicator to logic high ("1") as shown at 406. Whatever data was present at the D-input terminals of latch group 310 at time of the last COM CLK clock pulse remains frozen at the Q-output terminals of latch group 310.

At time point $t=t_7$ of FIG. 4A, the command-complete detecting means 382 recognizes, after polling the protocol line(s) 333 as part of the scan out data (SOD), that a command complete (CMD CPT) indication has been issued for communications latch group 310 or another communications latch group, as indicated by the scan address of the line 333 having the command complete (CMD CPT) indication on it. This detection event is represented by an upwardly pointed arrow 407 on a PRO-SOD line of FIG. 4A.

By time point $t=t_8$ of FIG. 4A, the command complete recognizing means 382 of the SVP will have detected the command complete (CMD CPT) indication 406 and it will acknowledge this by dropping command valid (CMD VAL) to logic low ("0") as indicated at 408. At time point $t=t_9$, the polling means 349 of the MFU 210 will have detected the drop 408 of the command valid (CMD VAL) indicator and the MFU 210 will acknowledge this by dropping the command complete (CMD CPT) indicator to logic low ("0") as indicated at 409. At following time point $t=t_{10}$, the protocol conditions are the same as at time point $t=t_0$ and the process repeats as indicated by the cycle indicator connecting time point $t=t_{10}$ back to $t=t_0$.

Figure 4B:
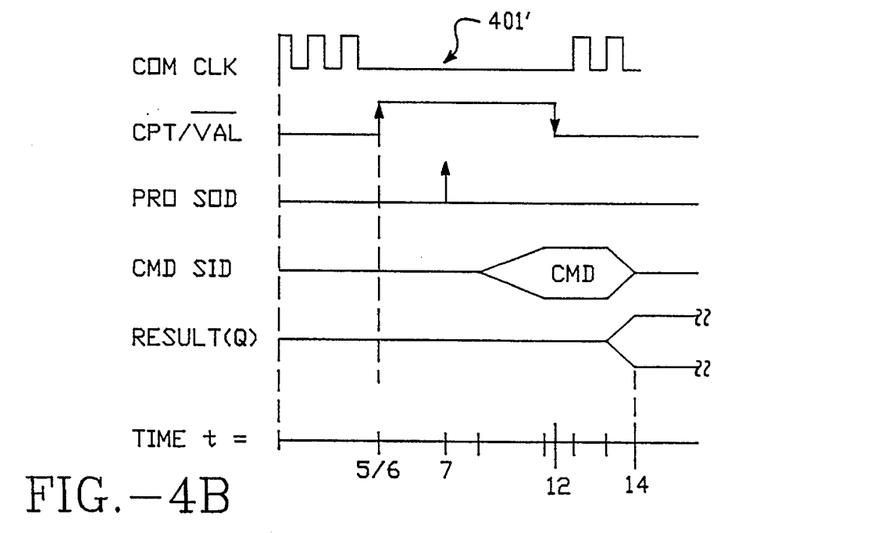
FIG. 4B is a timing diagram showing a handshake protocol for a one wire system.

FIG. 4B is a timing diagram showing a handshake protocol for a one wire system in which command complete (CMD CPT) for a given result-holding latch group and command valid (CMD VAL) for the same or a different command-holding latch group are indicated on a same protocol line 333 as binary complements of one another. Command valid (CMD VAL) also acts as the CLK ENB value.

The advantage of a one-wire protocol system is faster response time. When CPT/VAL switches to logic high ("1") as a result of an MFU initiated process, the COM CLK clock pulses stop at the same time. (This occurs because command valid (CMD VAL) acts as the CLK ENB value for one or both of the next-command-holding latch group and the latch group that holds the previous result.) When command scan in completes, the SVP 220 drives the CPT/VAL line to logic low ("0") by issuing a "set command valid" signal 332. The COM CLK clock pulses turn back on at the same time and the MFU 210 immediately processes the command. At the same time that the valid result loads into the result-holding latch group, the MFU 210 issues the "set command complete" signal 331, CPT/VAL switches to logic high ("1") as a result, the COM CLK clock pulses stop, and this freezes the result in the result-holding latch group for scan out by the SVP 220.

The one-wire protocol of FIG. 4B is particularly useful in cases where many blocks of data pass between the MFU 210 and SVP 220 during execution of an immediate control operation. Display-memory and alter-memory are good examples. If a large block of memory is to be displayed or alterer, the same communications latch group (310 or another) is used many times to pass portions of the memory block between the SVP 220 and the MFU 210. Rapid turn around in the handshaking protocol is desirable at such times in order to minimize the total time consumed for transferring the full block of data.

Figure 5A:
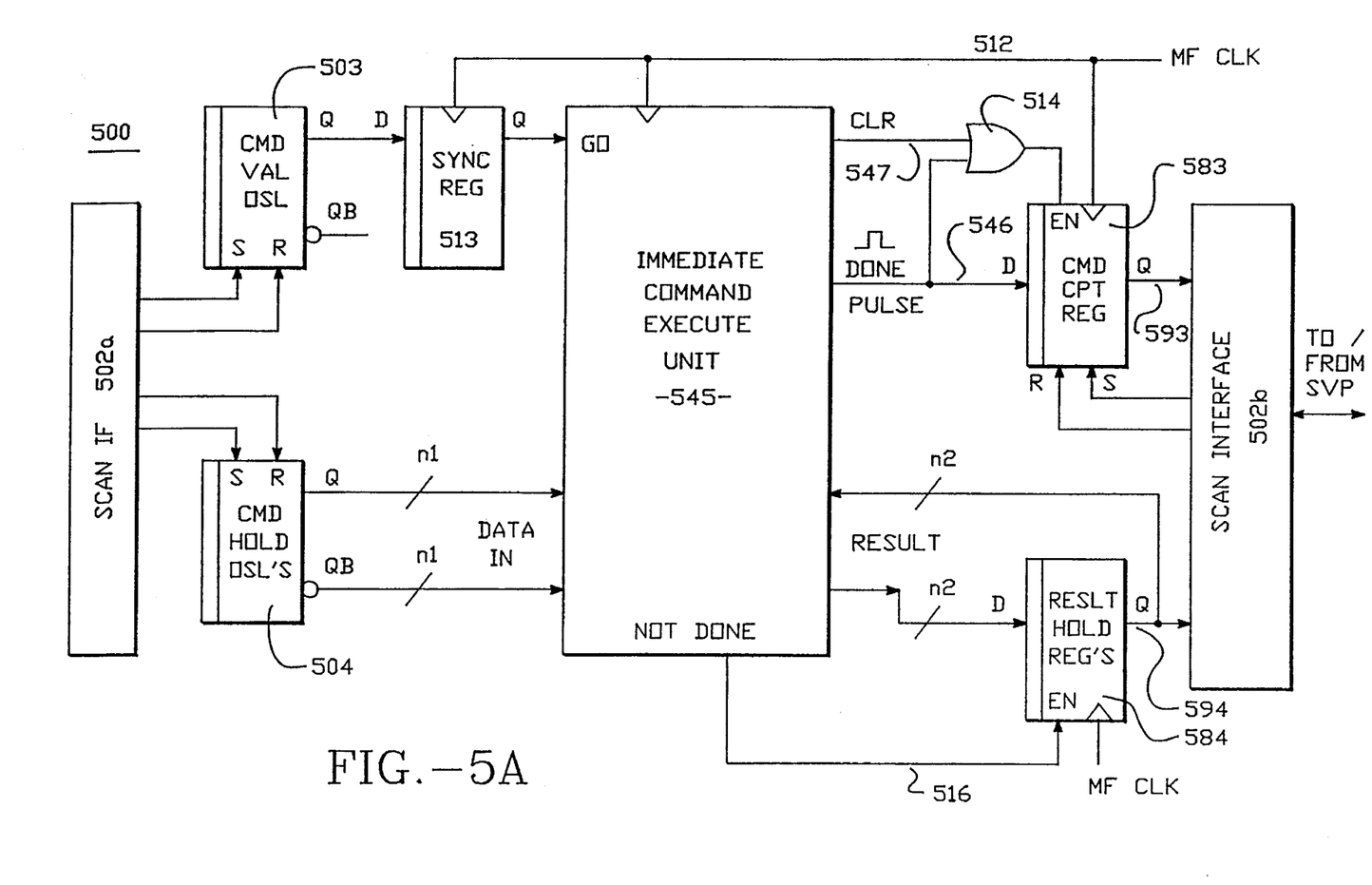
FIG. 5A is a schematic diagram of a 2-wire protocol circuit.

FIG. 5A is a schematic diagram of a 2-wire protocol circuit 500. Sections 502a and 502b represent portions of the scan interface 502. Element 503 is a so-called "operating state latch" (OSL) whose state is changed only by the scan interface 502. Operating state latches (OSL's) are not clocked by the mainframe clock (MF CLK) 512. The Q-output of OSL 503 represents the command valid (CMD VAL) indication. Element 504 represents a bank of command-holding OSL's. A command is loaded into these OSL's 504 using the group-reset and individual-set algorithm described above and then the command valid OSL 503 is set.

Register 513 is clocked by the mainframe clock (MF CLK) 512 and it is used to synchronize the command valid indication of OSL 503 to the mainframe clock (MF CLK) 512 and to supply the synchronized indication to the GO input of an immediate control command executing unit 545. Upon receipt of the GO command, command executing unit 545 processes the data held in the command-holding OSL's 504 and it formulates a corresponding result which it loads into result-holding registers 584. The result-holding registers 584 are clocked by the mainframe clock (MF CLK) 512 and enabled by a not-done level 516 output by the command executing unit 545.

The command executing unit 545 outputs a logic high ("1") done pulse 546 as it loads the final result data into result-holding registers 584 and it also drops the not-done level 516 to logic low ("0"). The data within the result-holding registers 584 is then frozen in place.

At the same time, the logic high ("1") done pulse 546 loads into a command complete (CMD CPT) register 583. The done pulse 546 also passes through a clock-enabling OR gate 514 and forces a logic high ("1") pulse on the clock enable (EN) terminal of the command complete register 583. This enables the command complete (CMD CPT) indication to load into register 583. Scan interface section 502*b* polls the Q-output of command complete register 583 over protocol line 593 to sense the command complete (CMD CPT) condition. Scan interface section 502*b* then scans out the Q-outputs of the result-holding registers 584 over lines 594 to read the result data held therein.

Command complete register 583 can be cleared in two ways. Scan interface section 502*b* can scan in a reset pulse to the R input of command complete register 583 using a special group-reset address value (gR) or the command executing unit 545 can hold the done pulse line 546 at logic low ("0") and assert a logic high clear pulse (CLR) on another input 547 of clock-enabling OR gate 514.

The command valid OSL 503 is cleared by a special group-reset address value (gR) set aside for clearing its command valid (CMD VAL) indication.

Figure 5B:
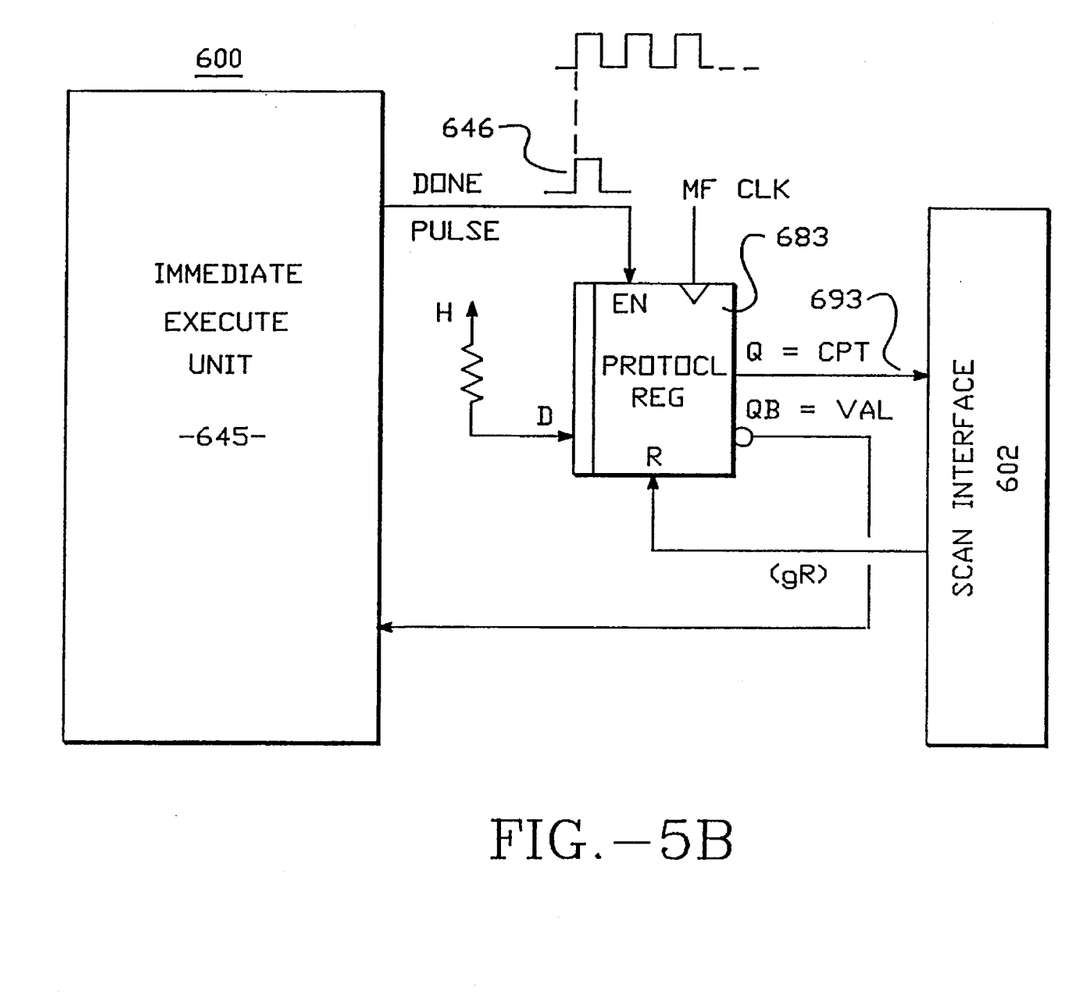
FIG. 5B is a schematic diagram of a 1-wire protocol circuit.

FIG. 5B is a schematic diagram of a one-wire protocol circuit 600. A done pulse 646 is applied to the clock EN terminal of protocol register 683 to load a tied-high logic level into the D-input of register 683. The Q-output represents the CPT/VAL indication. The Q-bar output of register 683 represents the inverse. Command valid (CMD VAL) is set by applying a special group-reset address value (gR) to the scan interface 602 to thereby reset register 683.

The above disclosure is to be taken as illustrative of the invention, not as limiting its scope or spirit. In further summary, it has been shown that a main system (MFU) is provided with a command-holding memory area and a result-holding memory area, where the two areas can be different or overlapping. The command-holding memory area can be clocked or unclocked (clocked registers or OSL's). A scan interface is provided for writing requests/commands into the command-holding memory area and for reading results out of the result-holding memory area. A protocol means is provided within the main system (MFU) for indicating to a secondary system (SVP), via the scan interface, when the secondary system (SVP) can scan in a command via the scan interface into the command-holding memory area and when the secondary system (SVP) can scan out a result via the scan interface from the result-holding memory area. The protocol means also indicates to the main system (MFU) when it is permissible for the main system (MFU) to execute a command stored in the command-holding memory area and to store a corresponding result in the result-holding memory area.

Numerous modifications and variations will become apparent to those skilled in the art after studying the above disclosure. By way of example, the roles of the MFU 210 and the SVP 220 can be reversed. The MFU 210 can set up a command in MFU memory which the SVP 220 is to execute, raise an appropriate protocol indicator and allow the SVP 220 to scan the command out. When the SVP 220 completes execution, it scans in the results and signals the MFU 210 that a valid result now sits in a result-holding area of the MFU 210.

Given the above disclosure of general concepts and specific embodiments, the scope of protection sought is to be defined by the claims appended hereto.

What is claimed is:

1. A structure comprising:

a main unit (MFU) and a supervising unit (SVP), where the main unit (MFU) is clocked independently of the supervising unit (SVP) by a main clock generator, where the main unit (MFU) has a clocked memory means that normally operates in synchronism with the main clock generator;

clock turn-off means within the main unit (MFU) for shutting off clocks to the clocked memory means in response to one or more prespecified internal events within the main unit (MFU);

scan interface means interconnecting the supervising unit (SVP) to the main unit (MFU);

command sending means within the supervising unit (SVP) for sending a command by way of the scan interface means to a command-holding area of the memory means within the main unit (MFU);

result-writing means within the main unit (MFU) for writing, in response to the command, result data into a result-holding area of the memory means within the main unit (MFU), the result-holding area being the same or different from the command-holding area of the main unit memory means; and protocol means for initiating said clock turn-off means to shut off of the clocks to the clocked memory means upon completion of said writing of the result data into the result-holding area, said protocol means being further for communicating to the supervising unit (SVP) by way of the scan interface means that the result data had been written into a result-holding area of memory means and that the supervising unit (SVP) can now read that result data by way of the scan interface means.

2. A method comprising the steps of:

(a) providing a communications memory means within a clocked first computer system;

(b) providing a protocol means within the first computer system for indicating various communications states;

(c) providing a scan interface means, operatively coupled to the communications memory means and the protocol means, for interrogating the state of the protocol means and for scanning data into or out of the communications memory means within the first computer system;

(d) coupling a second computer system to the first computer system by way of the scan interface means such that the second computer system communicates with the protocol means and the communications memory means by way of the scan interface means;

(e) operating the protocol means so as to indicate to the second computer system by way of the scan interface means when it is permissible for the second computer system to scan data into or out of the communications memory means of the first computer system, wherein said step (e) further disabling the first computer system from being able to use the communications memory means by disabling a clock input of the communications memory means; and (f) further operating the protocol means so as to indicate to the first computer system whether and/or when the second computer system has scanned data into or out of the communications memory means.

3. A method according to claim 2 wherein said step (e) of operating the protocol means includes as substeps:

(e.1) waiting for the first computer system to complete usage of the communications memory means; and (e.2) upon completion by the first computer system of usage of the communications memory means, sending a command complete signal by way of the protocol means and by way of the scan interface means to the second computer system to indicate that it is now permissible for the second computer system to scan data into or out of the communications memory means of the first computer system.

4. A method according to claim 2 wherein said step (f) of further operating the protocol means includes as substeps:

(f.1) waiting for the second computer system to complete usage of the communications memory means; and (f.2) upon completion by the second computer system of usage of the communications memory means, sending a command valid signal by way of the scan interface means and by way of the protocol means to the first computer system to indicate that the second computer system has scanned data into the communications memory means; and wherein said step (e) of operating the protocol means further includes after said disabling substep (e.3) and after said substep (f.2), the additional substep of:

(e.4) re-enabling the first computer system to use the communications memory means.

5. A method according to claim 2 wherein said step (f) of further operating the protocol means includes as substeps:

(f.1) waiting for the second computer system to complete usage of the communications memory means; and (f.2) upon completion by the second computer system of usage of the communications memory means, sending a command valid signal by way of the scan interface means and by way of the protocol means to the first computer system to indicate that the second computer system has scanned data into the communications memory means.

* * * * *